US00RE45746E

(19) United States
(12) Reissued Patent
Carr et al.

(10) Patent Number: US RE45,746 E
(45) Date of Reissued Patent: Oct. 13, 2015

(54) PERIPHERAL SEALING SYSTEM FOR PRE-TENSIONED SCREENS

(71) Applicants: Brian S. Carr, Burlington, KY (US); Graham Alexander Robertson, Edinburgh (GB); Eric Cady, Florence, KY (US)

(72) Inventors: Brian S. Carr, Burlington, KY (US); Graham Alexander Robertson, Edinburgh (GB); Eric Cady, Florence, KY (US)

(73) Assignees: M-I L.L.C., Houston, TX (US); United Wire Limited, Edinburgh (GB)

(21) Appl. No.: 14/099,392

(22) Filed: Dec. 6, 2013

Related U.S. Patent Documents

Reissue of:
(64) Patent No.: 8,496,116
Issued: Jul. 30, 2013
Appl. No.: 13/031,494
Filed: Feb. 21, 2011

U.S. Applications:
(63) Continuation of application No. 11/862,805, filed on Sep. 27, 2007, now Pat. No. 7,891,497.

(60) Provisional application No. 60/827,470, filed on Sep. 29, 2006.

(51) Int. Cl.
*B07B 1/49* (2006.01)
*B07B 1/46* (2006.01)

(52) U.S. Cl.
CPC ..... *B07B 1/46* (2013.01); *B07B 1/4645* (2013.01); *Y10T 29/49826* (2015.01)

(58) Field of Classification Search
CPC .... B07B 1/46; B07B 1/4645; Y10T 29/49826
USPC ..... 209/395, 399, 404, 405, 408; 277/637, 277/641, 642, 644, 645, 648
See application file for complete search history.

(56) References Cited

U.S. PATENT DOCUMENTS

| | | | | |
|---|---|---|---|---|
| 5,004,049 | A | 4/1991 | Arterbury | |
| 5,311,942 | A | 5/1994 | Nagaoka et al. | |
| 5,944,993 | A * | 8/1999 | Derrick et al. | 210/388 |
| 6,070,736 | A * | 6/2000 | Ballman et al. | 209/325 |

(Continued)

FOREIGN PATENT DOCUMENTS

| | | | |
|---|---|---|---|
| CN | 1401440 | A | 3/2003 |
| WO | 2004035232 | A1 | 4/2004 |
| WO | 2004069429 | A1 | 8/2004 |

OTHER PUBLICATIONS

First Examination Report in counterpart Indian Patent Application No. 2037/DELNP/2009, mailed Sep. 23, 2014 (2 pages).

(Continued)

*Primary Examiner* — Joseph Kaufman
(74) *Attorney, Agent, or Firm* — Osha Liang LLP

(57) ABSTRACT

A method of forming a shaker screen includes forming a frame, and attaching a first sealing element to at least one side of an outer perimeter of the frame, wherein the attaching comprises aligning a first mating surface of the frame to a second mating surface of the first sealing element, and wherein the first mating surface of the frame includes an extension, and the second mating surface of the first sealing element includes a groove configured to align with the extension. A system of sealing shaker screens includes a first screen and a second screen disposed adjacent the first screen, wherein a first sealing element of a first frame and a portion of the second screen interact to provide a seal between the first screen and the second screen.

18 Claims, 6 Drawing Sheets

(56) References Cited

U.S. PATENT DOCUMENTS

| | | | | |
|---|---|---|---|---|
| 6,269,954 | B1 * | 8/2001 | Baltzer | 209/405 |
| 6,340,089 | B1 * | 1/2002 | Bakula | 210/388 |
| 6,443,310 | B1 * | 9/2002 | Schulte et al. | 209/399 |
| 6,510,947 | B1 * | 1/2003 | Schulte et al. | 210/388 |
| 6,530,483 | B2 * | 3/2003 | Schulte et al. | 209/399 |
| 6,565,698 | B1 * | 5/2003 | Adams et al. | 156/290 |
| 6,669,027 | B1 * | 12/2003 | Mooney et al. | 209/405 |
| 6,708,829 | B2 * | 3/2004 | Robertson et al. | 209/405 |
| 6,759,000 | B2 * | 7/2004 | Cook et al. | 264/279 |
| 6,789,680 | B2 * | 9/2004 | Ward et al. | 209/403 |
| 6,874,218 | B2 * | 4/2005 | Hicks et al. | 29/450 |
| 6,923,273 | B2 | 8/2005 | Terry et al. | |
| 6,955,262 | B2 * | 10/2005 | Seyffert et al. | 209/405 |
| 7,000,777 | B2 * | 2/2006 | Adams et al. | 209/399 |
| 7,389,882 | B2 * | 6/2008 | Cady et al. | 209/405 |
| 2002/0000399 | A1 * | 1/2002 | Winkler et al. | 209/399 |
| 2002/0043485 | A1 * | 4/2002 | Schulte et al. | 209/399 |
| 2002/0130064 | A1 * | 9/2002 | Adams et al. | 209/399 |
| 2003/0136710 | A1 * | 7/2003 | Adams et al. | 209/405 |
| 2004/0074820 | A1 * | 4/2004 | Sawall et al. | 209/405 |
| 2004/0149632 | A1 | 8/2004 | Schulte et al. | |
| 2004/0195155 | A1 * | 10/2004 | Mooney et al. | 209/399 |
| 2007/0187303 | A1 * | 8/2007 | Fisher et al. | 209/404 |
| 2008/0078699 | A1 * | 4/2008 | Carr | 209/233 |

OTHER PUBLICATIONS

PCT International Search Report issued in PCT Application No. PCT/US2007/079941 dated Jan. 22, 2008 (3 pages).

PCT Written Opinion issued in PCT Application No. PCT/US2007/079941 dated Jan. 22, 2008 (3 pages).

Office Action issued in corresponding European Application No. 07815023.2; Dated Nov. 11, 2012 (4 pages).

Office Action issued in corresponding Chinese Application No. 200780036487.7; Dated Mar. 21, 2012 (8 pages).

Examination Report issued in corresponding Canadian Application No. 2,664,446; Dated Mar. 26, 2012 (2 pages).

Supplementary European Search Report issued in corresponding European Application No. 07815023.2; Dated Mar. 28, 2012 (6 pages).

Office Action issued in corresponding Chinese Application No. 200780036487.7; Dated Jul. 29, 2011 (11 pages).

Office Action issued in corresponding Mexican Application No. MX/a/2009/003279 with English language communication reporting the same; Dated Jul. 20, 2012 (3 pages).

Office Action issued in corresponding Chinese Application No. 200780036487.7; Dated Jul. 9, 2012 (12 pages).

Office Action issued in corresponding European Application No. 07815023.2; Dated Nov. 22, 2012 (4 pages).

Examiner's Report issued in corresponding Canadian Application No. 2,664,446; Dated Jan. 2, 2013 (2 pages).

Office Action issued in corresponding Chinese Application No. 200780036487.7; Dated Feb. 5, 2013 (5 pages).

* cited by examiner

PERIPHERAL SEALING SYSTEM FOR PRE-TENSIONED SCREENS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a continuation of U.S. patent application Ser. No. 11/862,805, filed on Sep. 27, 2007, assigned to the assignee of the present application and incorporated herein by reference in its entirety, which claims priority under 35 U.S.C. § 119(e) to U.S. Provisional Application Ser. No. 60/827,470, filed Sep. 29, 2006. The contents of these applications are incorporated herein by reference.

BACKGROUND

1. Field of the Disclosure

Embodiments disclosed herein relate generally to oilfield shale shakers. More particularly, embodiments disclosed herein relate to screen frames for oilfield shale shakers.

2. Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and repumped down through nozzles of the drill bit, the cutting particulates must be removed.

One type of apparatus in use to remove cuttings and other solid particulates from drilling mud is commonly referred to in the industry as a "shale shaker." A shale shaker, also known as a vibratory separator, is a vibrating sieve-like table upon which returning used drilling mud is deposited and through which substantially cleaner drilling mud emerges. Typically, the shale shaker is an angled table with a generally perforated filter screen bottom. Returning drilling mud is deposited at the top of the shale shaker. As the drilling mud travels down the incline toward the lower end, the fluid falls through the perforations to a reservoir below, thereby leaving the solid particulate material behind. The combination of the angle of inclination with the vibrating action of the shale shaker table enables the solid particles left behind to flow until they fall off the lower end of the shaker table. Preferably, the amount of vibration and the angle of inclination of the shale shaker table are adjustable to accommodate various drilling mud flow rates and particulate percentages in the drilling mud. After the fluid passes through the perforated bottom of the shale shaker, it may either return to service in the borehole immediately, be stored for measurement and evaluation, or pass through an additional piece of equipment (e.g., a drying shaker, a centrifuge, or a smaller sized shale shaker) to remove smaller cuttings and/or particulate matter.

Because shale shakers are typically in continuous use, repair operations, and associated downtimes, need to be minimized as much as possible. Often, the filter screens of shale shakers, through which the solids are separated from the drilling mud, wear out over time and subsequently require replacement. Therefore, shale shaker filter screens are typically constructed to be easily removable and quickly replaceable. Generally, through the loosening of several bolts, the filter screen may be lifted out of the shaker assembly and replaced within a matter of minutes. While there are numerous styles and sizes of filter screens, they generally follow similar design. Typically, filter screens include a perforated plate base upon which a wire mesh, or other perforated filter overlay, is positioned. The perforated plate base generally provides structural support and allows the passage of fluids therethrough, while the wire mesh overlay defines the largest solid particle capable of passing therethrough. While many perforated plate bases are flat or slightly arched, it should be understood that perforated plate bases having a plurality of corrugated or pyramid-shaped channels extending thereacross may be used instead. The pyramid-shaped channels may provide additional surface area for the fluid-solid separation process to take place while acting to guide solids along their length toward the end of the shale shaker from where they are disposed.

A typical shale shaker filter screen includes a plurality of hold-down apertures at opposite ends of the filter screen. These apertures, preferably located at the ends of the filter screen that will abut walls of the shale shaker, allow hold down retainers of the shale shaker to grip and secure the filter screens in place. However, because of their proximity to the working surface of the filter screen, the hold-down apertures must be covered to prevent solids in the returning drilling fluid from bypassing the filter mesh through the hold-down apertures. To prevent such bypass, an end cap assembly is placed over each end of the filter screen to cover the hold-down apertures. Presently, these caps are constructed by extending a metal cover over the hold down apertures and attaching a wiper seal thereto to contact an adjacent wall of the shale shaker. Furthermore, epoxy plugs are set in each end of the end cap to prevent fluids from communicating with the hold-down apertures through the sides of the end cap.

Typically, screens used with shale shakers are placed in a generally horizontal fashion on a substantially horizontal bed or support structure located within a basket in the shaker. The screens themselves may be flat, nearly flat, corrugated, depressed, and/or contain raised surfaces. The basket in which the screens are mounted may be inclined towards a discharge end of the shale shaker. The shale shaker imparts a rapidly reciprocating motion to the basket and the screens. Drilling mud, from which particles are to be separated, is poured onto a back end of the vibrating screen. The drilling mud generally flows toward the discharge end of the basket. Large particles that are unable to pass through the screen remain on top of the screen, and move toward the discharge end of the basket where they are collected. Smaller particles and fluid pass through the screen and collect in a bed, receptacle, or pan therebeneath.

In some shale shakers, a fine screen cloth is used with the vibrating screen. The screen may have two or more overlying layers of screen cloth or mesh. Layers of cloth or mesh may be bonded together and placed over a support, multiple supports, a perforated plate, or an apertured plate. The frame of the vibrating screen is resiliently suspended or mounted upon a support, and is caused to vibrate by a vibrating mechanism (e.g., an unbalanced weight on a rotating shaft connected to the frame). Each screen may be vibrated to create a flow of trapped solids on top surfaces of the screen for removal and disposal thereof. The fineness or coarseness of the mesh of a screen may vary depending upon mud flow rate and the size of the solids to be removed.

As shown in FIG. 1, a typical shaker screen 10 may include a plurality of screens 12 secured in a shaker basket 14 by various methods, as known in the art. Such an arrangement with multiple screens may be advantageous because it allows for rapid disassembly for routine maintenance and replacement of parts when necessary. However, if the shaker screen is moved off its sealing surface or if neighboring screens are moved slightly apart from one another, the resulting gap may allow cutting particulates to bypass the screen.

Accordingly, there exists a need for a screen frame assembly that may be securely positioned within a shale shaker while effectively reducing the amount of cutting particulates that may bypass the screen. Further, there exists a need for forming a seal against a wall of the shaker and neighboring screens, thereby minimizing the passage of unfiltered drilling mud therethrough.

SUMMARY OF THE DISCLOSURE

In one aspect, embodiments disclosed herein relate to a system of sealing shaker screens, the system including a first screen having a first frame and a first sealing element attached to an outer perimeter of the first frame, and a second screen disposed adjacent the first screen, the second screen having a second frame and a second sealing element attached to an outer perimeter of the second frame, wherein the first sealing element and the second sealing element provide a seal between the first screen and the second screen.

In another aspect, embodiments disclosed herein relate to a method of forming a screen frame including forming a frame and attaching a sealing element to an outer perimeter of the frame.

In another aspect, embodiments disclosed herein related to a shaker screen including a frame and a sealing element attached to an outer perimeter of the frame, wherein the sealing element is attached by one selected from thermal bonding and co-molding.

Other aspects and advantages of the invention will be apparent from the following description and the appended claims.

DETAILED DESCRIPTION

In one aspect, embodiments disclosed herein relate to a screen frame assembly for an oilfield shale shaker. Specifically, embodiments disclosed herein relate to a screen frame assembly that may provide efficient sealing of a screen frame within a shale shaker. Further, embodiments disclosed herein relate to methods of forming screen frame assemblies.

Figure 2:
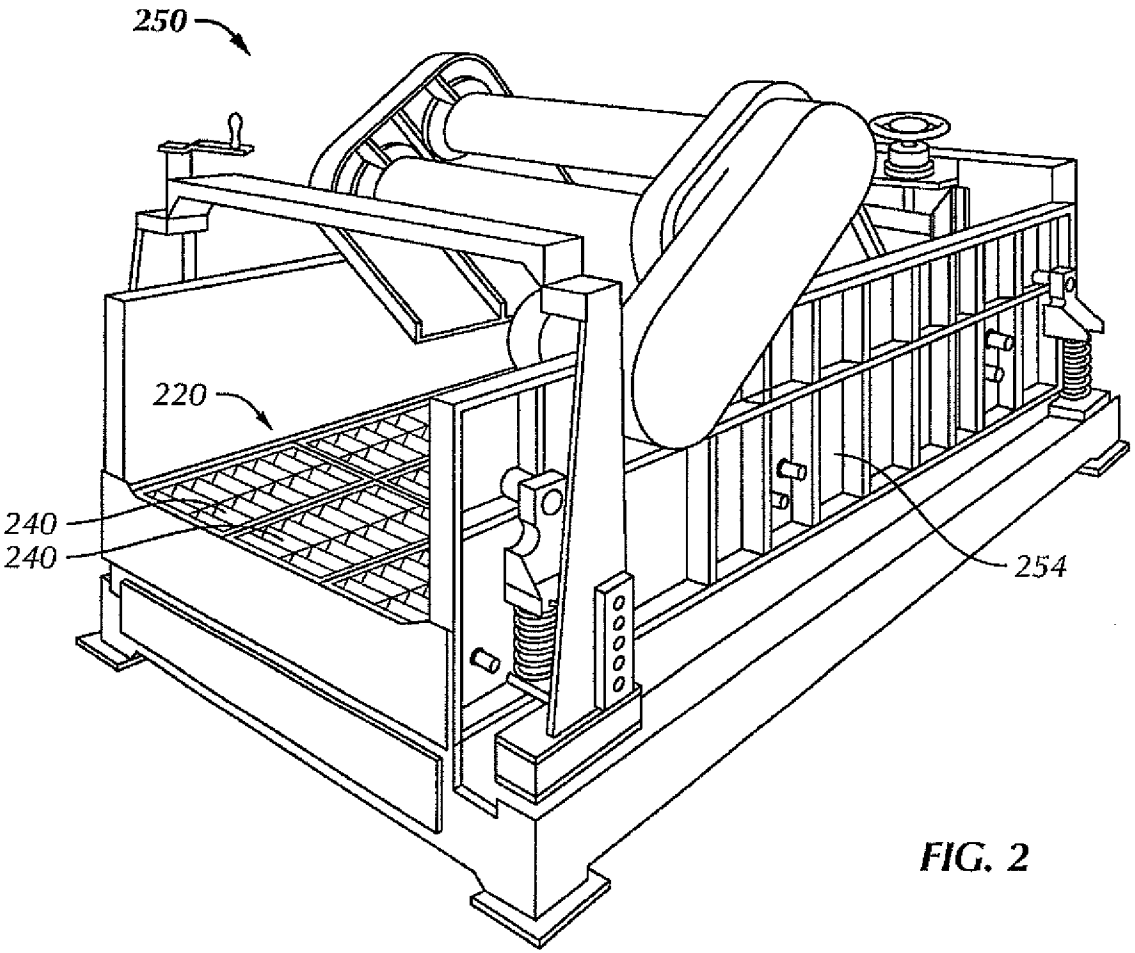
FIG. 2 shows a shaker fitted with a screen frame assembly in accordance with one embodiment of the present disclosure.

Referring to FIG. 2, in one embodiment, screen frame assembly 220 may be installed into a shale shaker 250 on a vibratory screen mounting apparatus or "basket" 254. The screen frame assembly 220 may be any screen frame assembly disclosed herein or have any combination of any feature or features of any screen or screen parts disclosed herein. In one embodiment, screen frame assembly 220 includes a plurality of screens 240. As shown in FIG. 2, the screen frame assembly 220 may include multiple screens 240. These multiple screens may be arranged in various configurations, some of which are illustrated in FIGS. 3A-3C.

Figure 3A:
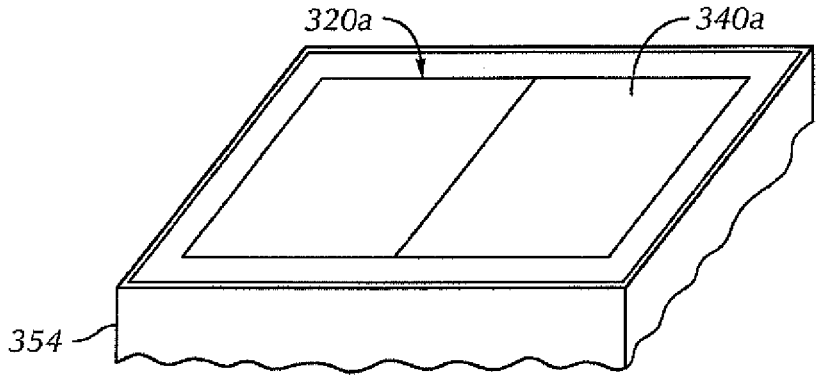
FIGS. 3a-c show configurations of a plurality of screens in accordance with embodiments of the present disclosure.
Figure 3B:
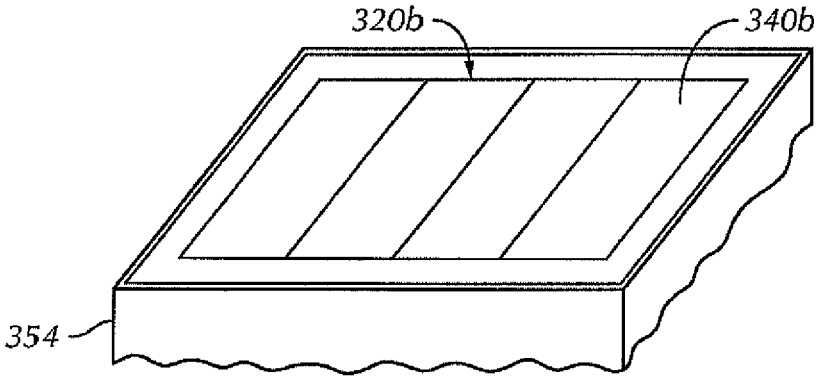
Figure 3C:
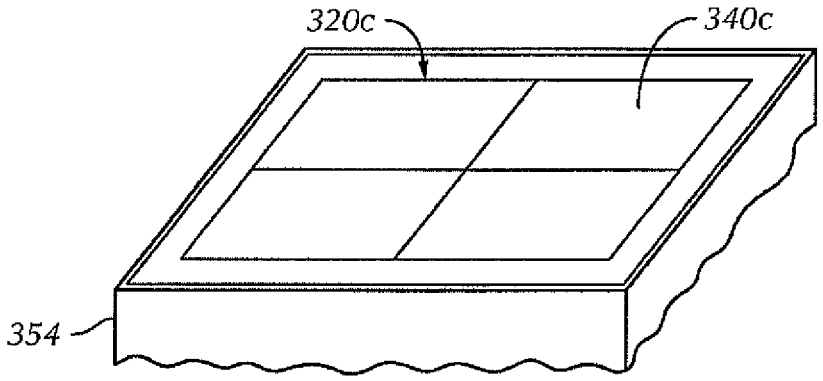

With reference to FIGS. 3A-3C screen frame assemblies 320a-c may include two screens 340a, four screens 340b or 340c, or any number of screens. One of ordinary skill in the art will appreciate that any number of screens may be disposed in shaker basket 354. Additionally, the screens 340b, 340c may be oriented in a columnar arrangement or in a grid-like arrangement as shown in FIGS. 3B and 3C, respectively. Each individual screen may have a number of features designed to provide a secure fit within the shaker basket as shown in FIG. 4.

Figure 1:
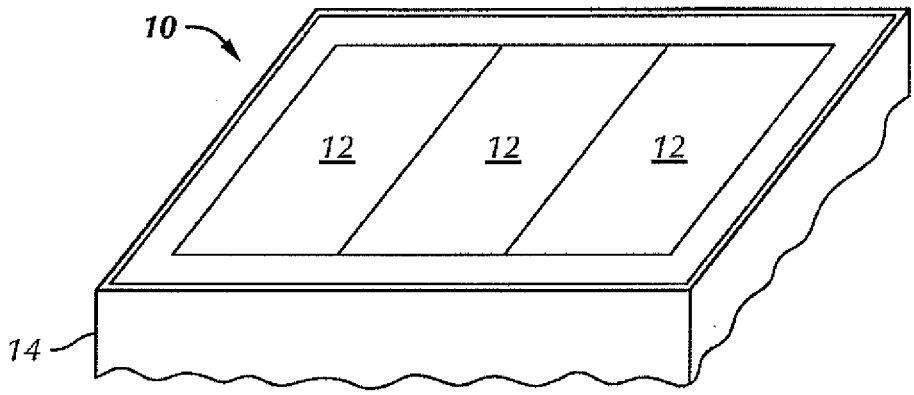
FIG. 1 (Prior Art)
FIG. 1 shows a prior art shaker screen with multiple screens.
Figure 4:
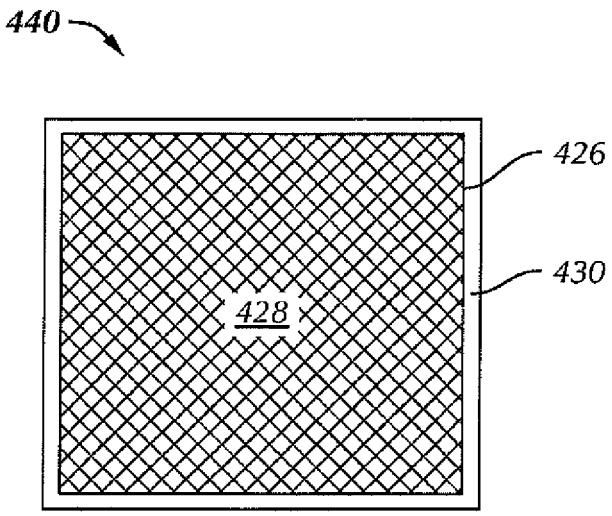
FIG. 4 shows a screen frame assembly in accordance with one embodiment of the present disclosure.

With reference to FIG. 4, a screen 440, in one embodiment, comprises a frame 426, a filtering element 428, and a sealing element 430 attached to the frame. Frame 426 may be formed from any material known in the art, for example, stainless steel, metal alloys, or plastics. Additionally, in one embodiment, frame 426 may be formed from a composite material. The composite material may include high-strength plastic, mixtures of high-strength plastic and glass, high-strength plastic reinforced with high-tensile-strength steel rods, and any combination thereof. Composite screen frames may provide more consistent manufacturing of the frame and may more evenly distribute mechanical stresses throughout the screen frame during operation. In another embodiment, frame 426 may include composite material formed around a steel or wire frame. Frame 426 may be formed, for example, by injection molding. A method of forming a screen frame by injection molding is disclosed in, U.S. Pat. No. 6,759,000 issued to Cook, et al., which is incorporated herein by reference in its entirety. A filtering element 428 may be integrated within frame 426 during the molding process, in one embodiment.

As shown in FIG. 4, filtering element 428 may be disposed on frame 426. The filtering element 428 may be a fine screen cloth or any other filtering mesh known in the art. Such filtering meshes may be made of, for example, plastics, metals, alloys, fiberglass, composites, and polytetrafluoroethylene (PTFE). The filtering element 428 may have two or more layers of the same or different filtering mesh and may be layered in any combination. Layers of filtering meshes may be bonded together and placed over a support, supports, or a perforated or apertured plate.

A sealing element 430 may be disposed on an outer perimeter of frame 426. In one embodiment, the sealing element 430 may be disposed along the entire outer perimeter, along an edge of frame 426. In another embodiment, the sealing element 430 may be disposed along a portion or portions of the outer perimeter, along the edge of frame 426. Sealing element 430 may provide a structural element to secure each screen 440 within an assembly, and may contact or compress against other sealing elements other sealing elements of neighboring screens or neighboring screen frames as shown in FIGS. 5A-5D and discussed in greater detail below.

Figure 5A:
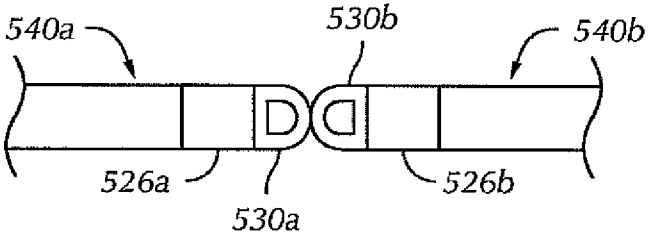
FIGS. 5a-d show cross-sectional views of screen frame assemblies in accordance with embodiments of the present disclosure.

With reference to FIGS. 5A-5D, embodiments relating to the configuration of a frame and sealing element, are shown. FIG. 5A shows a partial cross-sectional view of one embodiment in which a first screen 540a is disposed adjacent a second screen 540b. A first sealing element 530a and a second sealing element 530b, disposed along an outer perimeter of screens 540a and 540b, respectively, contact each other compressively. Note that the sealing elements 530a and 530b are attached to frames 526a and 526b, respectively, and may traverse the entire outer perimeter of each frame or select portions thereof. Thus, there may be contact, for example, between the first sealing element 530a and a plurality of other screens (depending on the configuration of the screen frame assembly) or the wall of the shaker basket.

Figure 5C:
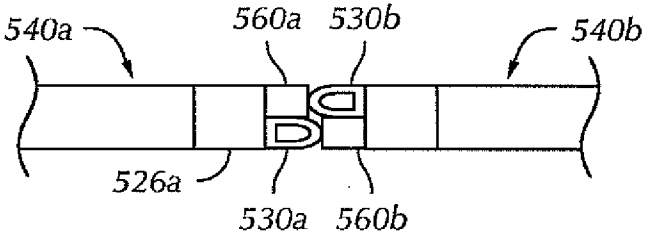
Figure 5B:
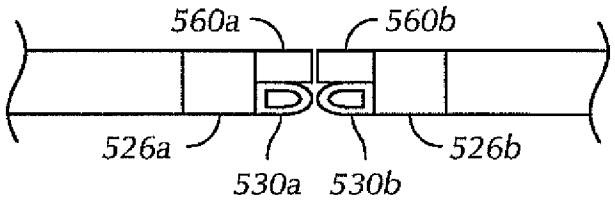

In an alternate embodiment, shown in FIG. 5B, stops 560a and 560b may be disposed along one or more edges of frames 526a and 526b, respectively, and may extend substantially over sealing elements 530a, 530b. Stops 560a and 560b may provide a seal between first frame 526a and second frame 526b. Accordingly, stops 560a and 560b may reduce or minimize the amount of particulates that bypass the screen frame assembly. Furthermore, stops 560a and 560b may provide protection of sealing elements 530a and 530b from wear and extend the life of sealing elements 530a and 530b by reducing the amount of mud and particulates directly contacting the sealing elements. Sealing elements 530a and 530b may act as a secondary seal to stops 560a and 560b. The stops 560a and 560b may be formed uniformly around the entire outer perimeter of frames 526a and 526b, respectively.

Alternatively, stops may be formed along selected portions or lengths of the frame. In one embodiment, stops 560a and 560b may include portions along a screen that may be adjacent or may contact the wall of the shaker. Sealing element 530a and 530b may be disposed below the stops 560a and 560b, respectively. The stops 560a and 560b may be co-molded from the same material as frames 526a and 526b, respectively, as a single element or it may be formed from a different material. Additionally, stops 560a and 560b may be attached to the frame 526a and 526b, respectively, by any method known in the art. For example, stops 560a and 560b may be thermally bonded, welded, or adhesively attached.

In another embodiment, as shown in FIG. 5C, a seal may be formed by a seal contacting a neighboring stop. The sealing element 530a of a first screen 540a may contact the stop 560b of a second screen 540b as shown in the partial cross sectional view of FIG. 5C. In this arrangement, the first sealing element 530a, disposed along at least a portion of an edge of first frame 526a, may compress against the second stop 560b. Likewise, second sealing element 530b, disposed along at least a portion of an edge of second frame 526b, compressively contacts first stop 560a.

As a result of this arrangement, a dual layer sealing effect may occur with second sealing element 530b disposed above first sealing element 530a. Second sealing element 530b may be formed from a material different from first seal 530a, for example, a more durable or more wear resistant material, to take into account its direct exposure to the drilling mud. The seal formed between first stop 560a and second seal 530b may reduce or minimize drilling particulates from bypassing the screen.

Figure 5D:
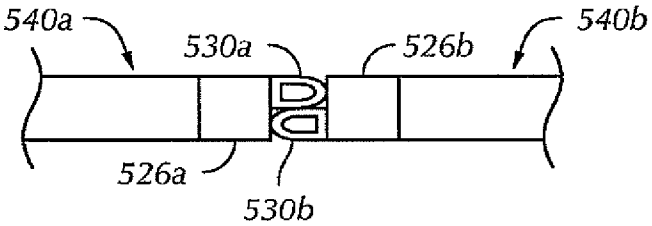

In another embodiment, as shown in FIG. 5D, a first sealing element 530a of a first screen 540a may contact a second frame 526b of a second screen 540b, as shown in FIG. 5D. Similarly, a second sealing element 530b of second screen 540b may contact a first frame 526a of first screen 540a. In this embodiment, first sealing element 530a, disposed on outer perimeter of first frame 526a, compressively contacts second frame 526b and may compressively contact second sealing element 530b disposed below it. Likewise, second sealing element 530b, disposed on an outer perimeter of second frame 526b, compressively contacts first frame 526a and may compressively contact first sealing element 530a above it. In another embodiment, the sealing elements 530a and 530b may be placed further apart from each other, such that no contact is made between them.

Figure 6:
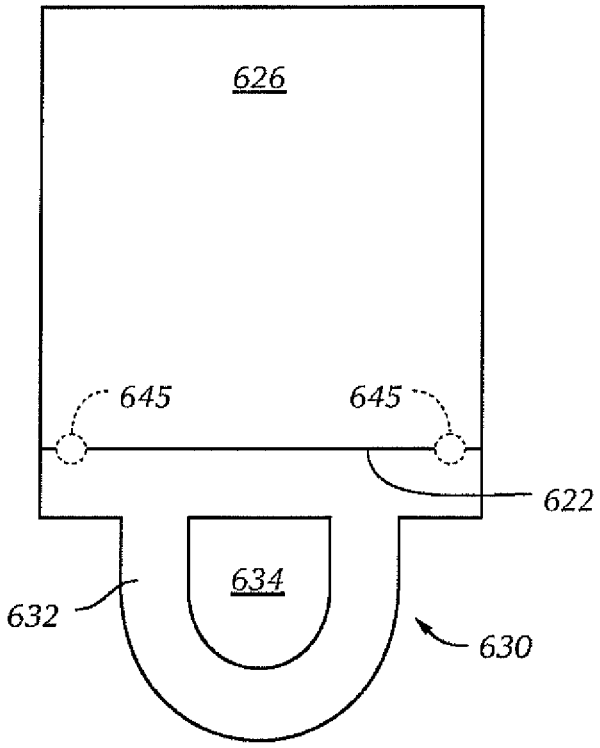
FIG. 6 shows a cross-sectional view of a sealing element attached to a frame in accordance with embodiments of the present disclosure.

FIG. 6 shows a partial cross sectional area of a sealing element 630 in accordance with an embodiment disclosed herein. As shown in FIG. 6, sealing element 630 may include a shell 632 and a core 634. The cross-sectional area of the sealing element, in some embodiments, may have a substantially rounded face. In one embodiment, the cross-sectional area of sealing element 630 is a D-shape. The configuration of sealing element 630, along with the composition of shell 632 and core 634, may be chosen to provide an effective seal.

Shell 632 of sealing element 630 may be formed from any material for sealing known to one of ordinary skill in the art including, but not limited to, rubbers, thermoplastic elastomers ("TPE"), foams, polychloroprene, polypropylene, and/or any combinations thereof. Shell 632, formed from TPE, may include, for example, polyurethanes, copolyesters, styrene copolymers, olefins, elastomeric alloys, polyamides, or combinations of the above. The sealing element 630 may include properties that allow high durability and elongation, as well as solvent and abrasion resistance. In certain embodiments, sealing element 630 may preferably include the properties of increased flexibility, slip resistance, shock absorption, and vibration resistance.

In one embodiment, core 634 may include a gas, foam, and/or other material including the same material as shell 632. The material for the sealing element 630 may be resistant to a variety of chemical conditioners used in mud formulations as known in the art. Sealing element 630 of different material compositions may be used on different screens in different sections of a single screen as determined by the location of the screen with respect to the assembly and relative to the position in the shaker. For example, for sections of sealing element 630 that may contact the wall of the shaker it may be beneficial to have that section of the sealing element 630 formed from a material different than the material used for sealing elements 630 disposed between neighboring screens.

Sealing element 630 may be attached to frames 626 by any method known in the art. In one embodiment, sealing element 630 may be attached to frame 626 by thermal bonding. For example, the sealing element 630 may be formed of a thermoplastic material that may be thermally bonded to the frame 626. One skilled in the art will recognize that any thermal bonding process may be used to attach the sealing element 630 to the frame 626, including for example, heat staking or ultrasonic welding. Sealing element 630 may be thermally bonded to frame 626 along the entire interface 622 between sealing element 630 and frame 626 or at specific predetermined locations 645.

In another embodiment, sealing element 630 may be integrally molded with frame 626. Sealing element 630 and frame 626 may be formed contemporaneously. One such method of forming and attaching sealing element 630 and frame 626 may include co-molding, using, for example, injection molding and/or gas injection molding, as known to those of ordinary skill in the art of molding plastics.

One method of co-molding sealing element 630 and frame 626 may include integrally molding sealing element 630 with frame 626. In this embodiment, sealing element 630 may be positioned within an injection mold for composite frame 626. Once the mold is sealed, a sealing element material (e.g., TPE) may be injected into the mold. The sealing element material is allowed to cure, and then the frame 626 including an integrally molded sealing element 630 may be removed. One of ordinary skill in the art will realize that alternative methods of attaching a sealing element 630 to a frame 626 exist, for example, using an adhesive resin, and as such, are within the scope of the present disclosure.

In certain embodiments of the present disclosure, the frame and the sealing element may be formed at substantially the same time. In such an embodiment, the frame and the sealing element may be formed via co-extrusion. Generally, co-extrusion includes the process of extruding two or more materials through a single die with two or more orifices arranged so that the extrudates merge and weld together into a laminar structure before cooling. However, in other embodiments, co-extrusion may include the injection of more than two materials extruded into two or more dies. Those of ordinary skill in the art will appreciate that co-extrusion may be used to form both a frame and a sealing element in accordance with the embodiments disclosed herein.

In one aspect of the present disclosure, a first material is extruded into a first orifice (molded into a desired geometry for a frame) of a die while a second material is extruded into a second or orifice (molded into a desired geometry of a sealing element) of the die. Both materials are allowed to cure, and then removed from the die. Because the materials were co-extruded, their interfacing profiles will substantially correspond. Thus, when the frame and the sealing element are aligned, their profiles will correspond such that they may be attached. By having a sealing element with a profile that substantially matches a corresponding frame, the attachment of the two components may be more secure.

Figure 7:
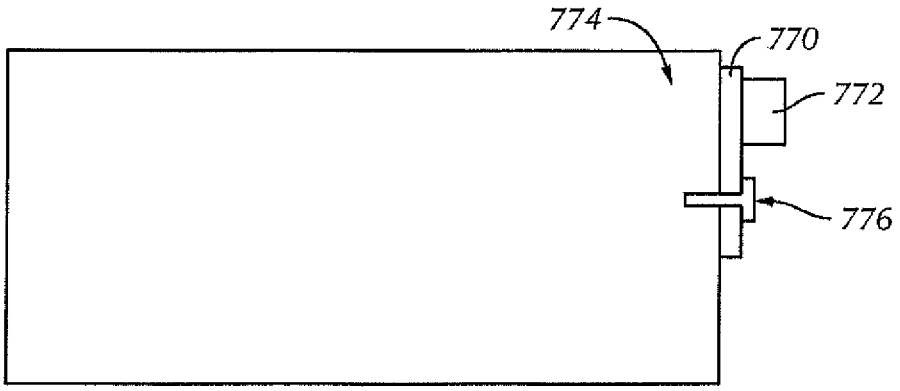
FIG. 7 shows a side view of a sealing element attached to a screen frame in accordance with embodiments of the present disclosure.

In certain embodiments, the aligning of the co-extruded frame and seal may benefit from additional attachment means, Exemplary methods of additional attachment may include mechanical fasteners (e.g., screws, bolts, and rivets), welding, heat staking, thermal bonding, and/or chemical adhesion. One such example is shown in FIG. 7, wherein a sealing element comprising a first portion 770 and a second portion 772 are mechanically attached to a screen frame 774 with a screw 776. First and second portions 770, 772 of the sealing element may be formed from a single material or, alternatively, from different materials. For example, the first portion 770 may be formed from polypropylene, while the second portion 772 may be formed from TPE.

Figure 8:
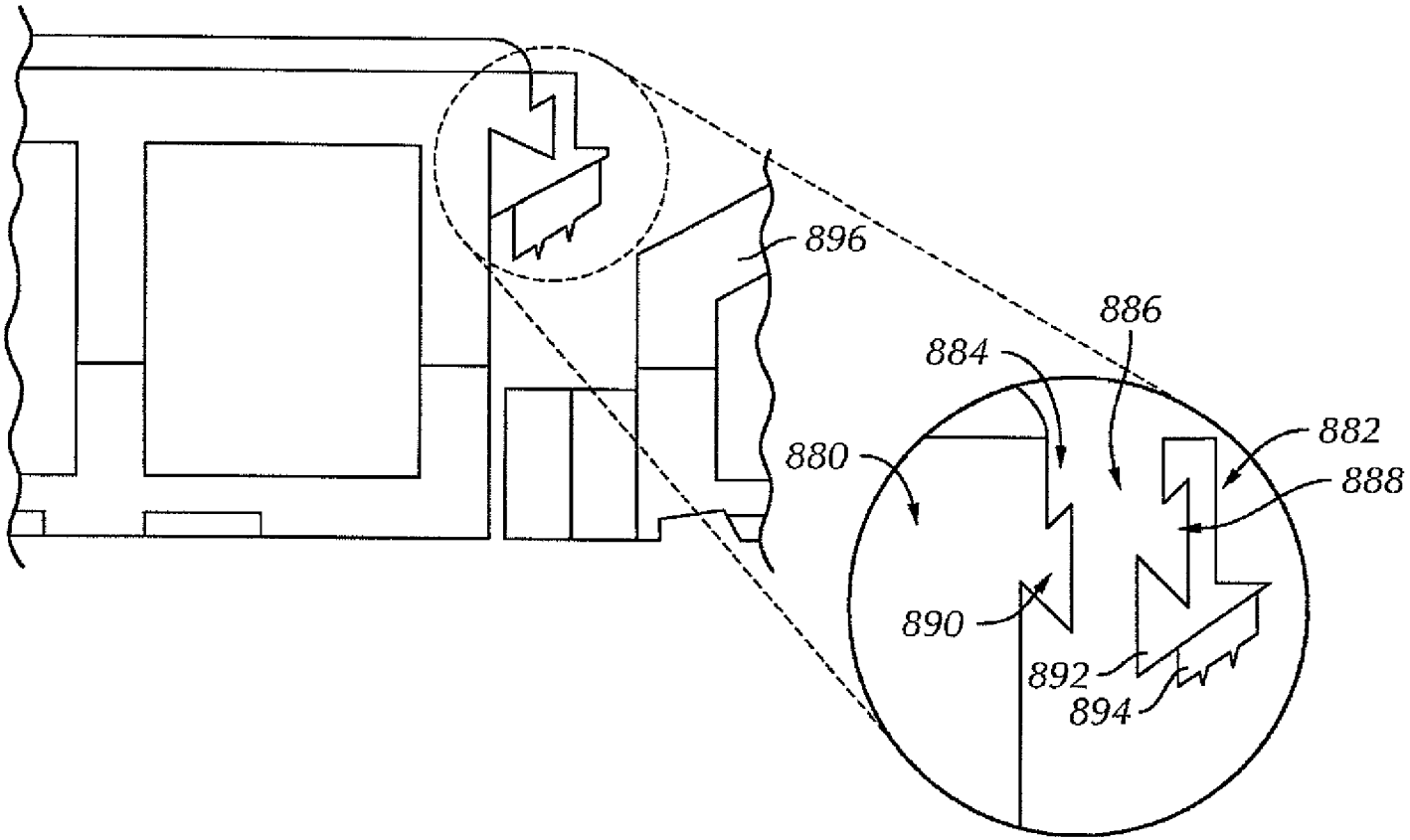
FIG. 8 shows a cross-sectional view of a co-extruded sealing element coupled to a screen frame in accordance with embodiments of the present disclosure.

Referring now to FIG. 8, to help ensure proper alignment between a frame 880 and a co-extruded sealing element 882, the frame maybe formed to include a first mating surface 884, while the co-extruded sealing element 882 is formed to include a second mating surface 886 configured to correspond to the first mating surface 884 of the screen frame 880. In one embodiment, the second mating surface 886 of the co-extruded sealing element 882 may include a groove 888 configured to align with an extension 890 of the first mating surface 884 of the screen. In alternate embodiments, the first mating surface 884 may include a groove (not shown), while an extension (not shown) of the second mating surface 886 is configured to align with the groove (not shown).

In some embodiments, co-extruded sealing element 882 may include a first portion 892 and a second portion 894. In this embodiment, the groove 888 is formed in the first portion 892, such that the first portion 892 is configured to couple with the extension 890 of the screen frame 880. The second portion 894 is configured to contact a second frame, an extension of a second screen frame 894, or a sidewall (not shown), and thus provide a seal. In one embodiment, first and second portions 892, 894 of co-extruded sealing element 882 may be formed from a single material. Alternatively, first and second portions 892, 894 of co-extruded sealing element 882 may be formed from different materials. For example, in one embodiment, the first portion 892 may be formed from polypropylene, and the second portion 894 may be formed from TPE.

Those of ordinary skill in the art will appreciate that in certain embodiments having a first and second mating surface, the extension portion may be designed with a slightly larger profile than the corresponding groove. As such, when the extension is aligned within the groove, a compression fit may be achieved. Such a compression fit may enhance the sealing characteristics of the seal, while preventing the sealing element from becoming disconnected from the screen during operation of the shaker.

Those of ordinary skill in the art will appreciate that multiple configurations of first and second mating surface may be used when forming frames and sealing elements in accordance with embodiments disclosed herein. For example, combinations of male/female connections, press-fit connections, and dovetails may also be used. Furthermore, those of ordinary skill in the art will appreciate that any of the above methods of forming corresponding frames and sealing elements may be used without co-extrusion.

In other embodiments, as described above, a sealing element of a screen may be configured to interact with a surface of a shaker. In such an embodiment, a screen may be designed to include a first mating surface that is configured to align with a second mating surface on the shaker. For example, the first mating surface of the screen may be configured to interface with the second mating surface of a feed end of a shaker basket. Such a configuration may prevent drilling fluid and solid particles from bypassing the shaker, thereby increasing the efficiency of the operation. In other embodiments, at least a portion of a sealing element of a screen may be configured to align with or interface with at least a portion of a shaker to prevent the loss of drilling fluid and solid particles therefrom.

Advantageously, embodiments disclosed herein may provide an efficient seal for a screen frame assembly within a shale shaker. Some embodiments may facilitate the disassembly, cleaning, maintenance, and repair of the screens used in a shale shaker. Further, embodiments disclosed herein may prevent fluids and drilling particulates from bypassing screen frames disposed in a shale shaker.

While the present disclosure has been described with respect to a limited number of embodiments, those skilled in the art, having benefit of this disclosure, will appreciate that other embodiments may be devised which do not depart from the scope of the present disclosure as described herein. Accordingly, the scope of the disclosure should be limited only by the attached claims.

What is claimed:

1. A method [of forming a shaker screen] comprising:

[forming] *providing* a frame;

attaching a first sealing element to [at least one side of] an outer perimeter of the frame[,] *;*

[wherein the attaching comprises] aligning a first mating surface of the frame to a second mating surface of the first sealing element, [and]

wherein *one of* the first mating surface [of the frame] *and the second mating surface* comprises an extension[,] and [the second mating surface of the first sealing element] *the other* comprises a groove configured to align with the extension, wherein a profile of the extension is larger than a profile of the groove; [and]

compressing the extension to engage the groove*; and inserting the frame into a vibratory separator*.

2. The method of claim 1, wherein [forming] *providing* the frame comprises attaching a stop to at least one side of the outer perimeter of the frame.

3. The method of claim 1, wherein [forming] *providing* the frame comprises attaching a filtering element to the frame.

4. The method of claim 1, wherein the attaching comprises at least one selected from mechanical fastening, welding, heat staking, thermal bonding, and chemical adhesion.

5. The method of claim 1, wherein the attaching further comprises sliding the first sealing element onto the extension on the frame.

6. The method of claim 1, wherein the first sealing element comprises a first portion and a second portion, wherein the first portion is configured to attach to the frame, and wherein the second portion is configured to contact a second [shaker screen] *frame*.

7. The method of claim 6, wherein the first portion of the first sealing element is co-molded to the second portion of the first sealing element.

8. The method of claim 1, further comprising attaching a second sealing element opposite the first sealing element.

9. A system [of sealing shaker screens] comprising:

a first screen comprising:

a first frame; and a first sealing element attached to at least one side of an outer perimeter of the first frame, wherein the first frame comprises a first mating surface and the first sealing element comprises a second mating surface configured to align with the first mating surface, and wherein *one of* the first mating surface [of the first frame] *and the second mating surface* comprises an extension, and the [second mating surface of the first sealing element] *other* comprises a groove configured to align with the extension, wherein a profile of the extension is larger than a profile of the groove, and wherein the extension is compressively engaged with the groove; [and]

a second screen disposed adjacent the first screen, wherein the first sealing element of the first frame and a portion of the second screen interact to provide a seal between the first screen and the second screen.

10. The system of claim 9, wherein the first screen comprises a stop attached to at least one side of the outer perimeter of the first frame.

11. The system of claim 9, wherein the first screen comprises a filtering element disposed on the first frame.

12. The system of claim 9, wherein the first sealing element is attached to the first frame using at least one selected from a group comprising mechanical fastening, welding, heat staking, thermal bonding, and chemical adhesion.

13. The system of claim 9, further comprising a second sealing element disposed on the first frame.

14. The system of claim 13, wherein the second sealing element is disposed opposite the first sealing element on the first frame.

15. The system of claim 9, wherein the first sealing element comprises a first portion and a second portion, wherein the first portion is configured to attach to the frame, and wherein the second portion is configured to contact a second shaker screen.

16. The system of claim 15, wherein the first portion of the first sealing element is co-molded to the second portion of the first sealing element.

17. A system comprising:

a first screen comprising:

a first frame; and a sealing element attached to at least one side of an outer perimeter of the first frame, wherein the first frame comprises a first mating surface and the first sealing element comprises a second mating surface configured to align with the first mating surface, wherein the first mating surface of the frame comprises a groove, and the second mating surface of the first sealing element comprises an extension configured to engage with the groove, wherein a profile of the extension is larger than a profile of the groove, and wherein when the extension is engaged with the groove, the extension is compressed; and a second screen disposed adjacent the first screen, wherein the first sealing element of the first frame and a portion of the second screen interact to provide a seal between the first screen and the second screen.

18. The apparatus of claim 17, wherein the sealing element comprises a first portion and a second portion, and wherein the first portion and the second portion of the sealing element are formed from different materials.

* * * * *